(12) United States Patent
Lefevre et al.

(10) Patent No.: US 9,945,670 B2
(45) Date of Patent: Apr. 17, 2018

(54) INTERFEROMETRIC MEASUREMENT DEVICE

(71) Applicant: IXBLUE, Saint-Germain-en-Laye (FR)

(72) Inventors: Herve Lefevre, Paris (FR); Frederic Guattari, Aubervilliers (FR); Cedric Molucon, Saint Germain en Laye (FR); Stephane Chouvin, Bagneux (FR)

(73) Assignee: IXBLUE, Saint-Germain-en-Laye (FR)

( * ) Notice: Subject to any disclaimer, the term of this patent is extended or adjusted under 35 U.S.C. 154(b) by 0 days.

(21) Appl. No.: 15/121,620

(22) PCT Filed: Feb. 26, 2015

(86) PCT No.: PCT/FR2015/050464
§ 371 (c)(1),
(2) Date: Aug. 25, 2016

(87) PCT Pub. No.: WO2015/128588
PCT Pub. Date: Sep. 3, 2015

(65) Prior Publication Data
US 2016/0363446 A1 Dec. 15, 2016

(30) Foreign Application Priority Data
Feb. 26, 2014 (FR) ...................................... 14 51543

(51) Int. Cl.
*G01C 19/72* (2006.01)
*G01B 9/02* (2006.01)

(52) U.S. Cl.
CPC ............. *G01C 19/722* (2013.01); *G01B 9/02* (2013.01); *G01C 19/726* (2013.01); *G01C 19/727* (2013.01); *G01B 2290/70* (2013.01)

(58) Field of Classification Search
CPC ...... G01B 9/02; G01B 2290/70; G01B 19/72; G01B 19/721; G01B 19/722; G01B 19/726; G01B 19/727
See application file for complete search history.

(56) References Cited

U.S. PATENT DOCUMENTS 5,331,404 A    7/1994  Moeller et al.
5,469,257 A *  11/1995 Blake ................... G01C 19/721
                                                              356/464

(Continued)

FOREIGN PATENT DOCUMENTS

EP         2 251 641 A1      11/2010

OTHER PUBLICATIONS

Burns W K et al.: "Excess noise in fiber gyroscope sources", IEEE Photonics Technology Letters, IEEE Service Center, Piscataway, NJ, US, vol. 2, No. 8, Aug. 1, 1990 (Aug. 1, 1990), pp. 606-608, XP011407052, ISSN: 1041-1135, DOI: 10.1109/68.58063.

(Continued)

*Primary Examiner* — Michael A Lyons
(74) *Attorney, Agent, or Firm* — Young & Thompson

(57) ABSTRACT

Interferometric measurement device includes a light source emitting a source signal and optical coupling elements receiving the source signal, directing part of the latter towards a measurement pathway including a Sagnac ring interferometer, of frequency $f_p$, producing a power output signal $P_{OUT}$ polarized according to a first polarization direction, tapping off another part of the source signal towards a compensation pathway producing a return power compensation signal $P_{RET}$, and directing the output and compensation signals towards detection elements. The compensation pathway includes polarization rotation elements producing the compensation signal according to a second cross-direction of polarization, and optical looping elements redirecting part of the compensation signal towards the measurement (Continued)

pathway; the detection elements include a single detector connected to the coupling elements for receiving the output signal and the compensation signal; the device further includes power equilibration elements equalizing the output power and/or return power are routed towards the detector.

20 Claims, 4 Drawing Sheets

(56) References Cited

U.S. PATENT DOCUMENTS

| | | | |
|---|---|---|---|
| 5,898,496 A * | 4/1999 | Huang | G01C 19/726 356/464 |
| 2003/0081219 A1 | 5/2003 | Bennett | |
| 2003/0128365 A1 * | 7/2003 | Strandjord | G01C 19/721 356/460 |

OTHER PUBLICATIONS

International Search Report, dated Jun. 12, 2015, from corresponding PCT application.
Polynkin, P., et al., "All-Optical Noise-Subtraction Scheme for a Fiber-Optic Gyroscope," Optics Letters, vol. 25, No. 3, Feb. 1, 2000, pp. 147-149.

* cited by examiner

INTERFEROMETRIC MEASUREMENT DEVICE

TECHNICAL FIELD OF THE INVENTION

The present invention relates to the optical metrology by interferometric method.

It relates more particularly to an interferometric measurement device that allows reducing the excess intensity noise of the light source used in this interferometric measurement device.

The invention finds a particularly advantageous application in the making of a gyrometer comprising such an interferometric measurement device and in the making of an inertial attitude or navigation unit using such a gyrometer.

TECHNOLOGICAL BACK-GROUND

It is known from the document U.S. Pat. No. 5,331,404 an interferometric measurement device including:
- a wide-spectrum spontaneous-emission light source emitting a source light signal,
- detection means delivering an electric signal representative of the result of a measurement of said parameter to be measured,
- electric processing and control means processing said electric signal to provide said measurement of said parameter to be measured, and
- optical coupling means:
    - receiving said source light signal,
    - directing a part at least of said source light signal towards a measurement pathway comprising a measurement interferometer that includes a phase modulator and a Sagnac ring, of proper frequency $f_p$, sensitive to said parameter to be measured, said interferometer receiving, as an input, an input light signal of input light power $P_{IN}$ and producing, as an output, an output light signal of output light power $P_{OUT}$ depending on said physical parameter to be measured and proportional to said input light power $P_{IN}$, said output light signal being polarized in a first polarization direction and modulated to a modulation frequency $f_m$ thanks to said phase modulator,
    - tapping off another part of said source light signal towards a noise compensation pathway distinct from said measurement pathway, said noise compensation pathway producing a compensation light signal having a return light power $P_{RET}$,
    - directing said output light signal and said compensation light signal towards said detection means.

In the following description, a light source is said of the "spontaneous emission" type when the spectrum of this source comprises a wavelength continuum.

As examples of such a source, it can be mentioned: the sun, a radiating heat source, a semi-conductor super-luminescent diode, also said super-radiant, or a super-fluorescent source with an amplifying fibre.

These super-luminescent, super-radiant or super-fluorescent sources are indeed spontaneous-emission sources, the spontaneous emission of which is amplified by a stimulated emission that keeps the spectral characteristics of the original spontaneous emission. The general term for this type of sources is "ASE" ("Amplified by Spontaneous Emission") source.

Unlike an ASE source, a laser source is not a spontaneous-emission light source, its emission spectrum comprises no wavelength continuum.

It will be moreover considered that a light source is of the "wide spectrum" type when the ratio between the Full Width at Half Maximum or FWHM of its continuous spectrum and its mean wavelength is higher than $10^{-7}$.

For example, a light source with a fibre doped with Erbium (chemical symbol Er), filtered by means of a Bragg filter, has typically a pseudo-Gaussian spectrum centred about a wavelength of 1530 nm to 1560 nm and having a full width at half maximum (FWHM) of about 5 to 20 nanometers (nm); this light source is hence a wide source, the ratio between its full width at half maximum and its mean wavelength being equal to about 3 to $12 \times 10^{-3}$.

A wide-spectrum spontaneous-emission light source emits a light signal whose light power is subjected to different sources of noise.

First is known the photonic noise $B_{ph}$, which is a "shot noise" and which is the theoretical limit of any light source. The photonic noise is a white noise whose value is directly linked to the light power of the light source.

More precisely, the photonic noise varies, in absolute terms, as the square root of the light power and hence, in relatives terms, as the inverse of the square root of the light power.

For example, a light signal at 1550 nm of 30 microwatt ($\mu W$) of power has a relative photonic noise $B_{ph}$ of $10^{-7}/Hz^{1/2}$ in standard deviation, i.e. $10^{-14}/Hz$ in noise power, i.e. also $-140$ decibels/Hz ($-140$ dB/Hz).

For a light signal of 300 $\mu W$ of power, hence ten times higher, the relative photonic noise $B_{ph}$ is of $-150$ dB/Hz, hence 10 dB/Hz lower in noise power, i.e. a factor 10 in noise power and a square-root factor of 10 ($10^{1/2} \approx 3.16$) in standard deviation.

Is also known the excess Relative Intensity Noise, or excess RIN, or simply RIN, which is also a white noise, but for frequencies lower than the tenth of the full width at half maximum of the optical frequency spectrum, FWHM(f), i.e. 0.1 to 0.3 terahertz (THz) for an FWHM (in wavelength) of 7 to 20 nm about a wavelength of 1550 nm.

The excess relative intensity noise $B_{RIN}$ is, in noise power, approximately equal to the inverse of the full width at half maximum of the optical frequency spectrum FWHM(f) of the wide-spectrum light signal, i.e. $B_{RIN}=1/FWHM(f)$.

Indeed, it is known that the excess intensity noise comes from the power beats between all the different frequency components of the continuous wide spectrum of the light signal that interfere between each other, these components having relative to each other different frequencies and a random phase.

The spectrum of the excess relative intensity noise is hence the result of an autocorrelation law: it begins at the zero frequency and has a width substantially equal to the width of the optical spectrum of the light source that is, for its part, centred about a very high frequency, about 200 THz for a wavelength of 1550 nm.

Hence, the same light signal of 30 $\mu W$ of power, which would have an optical-frequency full width at half maximum FWHM(f) of 1 THz, hence of $10^{12}$ Hz, would have, at low frequency, an excess relative intensity noise $B_{RIN}$ of $10^{-12}/Hz$ i.e. $-120$ dB/Hz, in noise power, and hence 20 dB/Hz above the power of the relative photonic noise $B_{ph}$ of $-140$ dB/Hz.

Such a wide-spectrum spontaneous-emission signal has an excess relative intensity noise that is the dominant source of noise and that it is advisable to compensate for, or even to cancel.

The interferometric measurement device of the document U.S. Pat. No. 5,331,404 uses for that purpose detection means that comprise two distinct optical radiation detectors measuring, for one of which, the output light signal produced by the measurement interferometer that is contaminated with the RIN noise of the light source, and for the other one, the noise compensation light signal contaminated with the same RIN noise.

It is then provided that the electric processing and control means process the electric signals delivered by each of the detectors, in order to subtract the RIN noise from the electric measurement signal with the RIN noise of the compensation signal, so that the measurement of the parameter is more accurate.

However, the interferometric measurement device of the document U.S. Pat. No. 5,331,404 proves difficult to implement due to the additional chain of electronic processing required for the subtraction of the RIN noise.

OBJECT OF THE INVENTION

In order to remedy the above-mentioned drawback of the state of the art, the present invention proposes an interferometric measurement device that allows compensating for, or even cancelling, optically and simply, the excess intensity noise contaminating the output light signal produced by the interferometer.

For that purpose, the invention relates to an interferometric measurement device as described in introduction.

According to the invention, said interferometric measurement device is such that:
said RIN noise compensation pathway comprises:
polarization rotation means adapted to produce said compensation light signal in a second polarization direction crossed with said first polarization direction, and
means for optically looping said compensation pathway to said measurement pathway, said looping means receiving said compensation light signal circulating on said compensation pathway and redirecting a part at least of said compensation light signal towards said measurement pathway,
said detection means comprise a single optical radiation detector connected to said optical coupling means, said optical coupling means receiving said output light signal or power $P_{OUT}$ and said compensation light signal of power $P_{RET}$, which circulate on said measurement pathway, for routing them towards said detector,
it is further provided power balance means adapted to correct said return light power $P_{RET}$ or said output power $P_{OUT}$ routed towards said detector, such that said return light power $P_{RET}$ is substantially equal to said output light power $P_{OUT}$ at the level of said detector, and
said compensation pathway has such a length that said output light signal has, at the level of the detector, a time delay $\tau$ with respect to said compensation light signal substantially equal to $1/(2*f_p)$.

The device according to the invention allows reducing, or even cancelling, the effect of the excess intensity noise of the light source on the measurement of the parameter to be measured thanks to the measurement interferometer, and that, using a single optical radiation detector.

Moreover, the making of such an interferometric measurement device, in particular of the electric processing and control means thereof, is easier because it uses only one light radiation detector and only one electronic processing chain.

Thanks to the configuration of the compensation pathway with its polarization rotation means and its optical looping means, it is possible to reinject, on the measurement pathway, the RIN noise compensation light signal that carries the same excess intensity noise as the output light signal, these two light signals being then routed to the single detector of the detection means thanks, in particular, to the optical coupling means.

As the output light signal and the compensation light signal are polarized in two polarization directions orthogonal to each other, these two signals cannot interfere between each other, so that the electric signal delivered by the optical radiation detector is directly proportional to the sum of the output light power $P_{OUT}$ and the return light power $P_{RET}$.

The length of the compensation pathway being adjusted so that the output light signal has, at the level of the detector, a time delay $\tau$ with respect to the compensation light signal substantially equal to $1/(2*f_p)$, and the return light power $P_{RET}$ being substantially equal to said output light power $P_{OUT}$ at the level of said detector thanks to the power balance means, the excess intensity noise at the characteristic frequencies equal to an odd multiple of the natural frequency $f_p$ (i.e. $f_p$, $3*f_p$, $5*f_p$, etc . . . ) of the measurement interferometer is reduced, or even cancelled, if $\tau=1/(2*f_p)$ and if $P_{OUT}=P_{RET}$ on the detector.

As explained in the book "The Fiber-Optic Gyroscope" (H. Lefèvre, Artech House, 1993), the output light signal, which carries the information about the parameter to be measured, is advantageously modulated at a modulation frequency $f_m$ that is actually an odd multiple of the proper frequency $f_p$ of the Sagnac ring interferometer (i.e. $f_m=(2k+1)*f_p$, k being a natural integer).

Hence, thanks to the interferometric measurement device according to the invention, it is advantageously possible to free from the effect of the excess intensity noise coming from the light source to perform an accurate measurement of the parameter to be measured.

In other words, thanks to the interferometric measurement device according to the invention, a delay line in light intensity (i.e. in power) is made, which allows optically subtracting, for all the frequencies that are odd multiples of the proper frequency fp of the measurement interferometer, from the measurement signal, a reference signal having at such frequencies the same excess intensity noise. The powers of the measurement and reference signals are summed on the detector, but at the odd multiples of the proper frequency, this summation is equivalent to a subtraction, because the noises at these frequencies are in phase opposition.

Advantageously, the time delay $\tau$ between the output light signal and the compensation light signal is comprised between $0.9/(2*f_p)$ and $1.1/(2*f_p)$, preferably between $0.99/(2*f_p)$ and $1.01/(2*f_p)$.

Preferably, the time delay $\tau$ is higher than $1/(2*f_p)$.

Advantageously, the ratio $P_{RET}/P_{OUT}$ between the return light power $P_{RET}$ and output light power $P_{OUT}$ is comprised between 0.8 and 1.2, preferably between 0.95 and 1.05.

Moreover, other advantageous and non-limitative characteristics of the interferometric measurement device according to the invention are the following:
said interferometric measurement device further includes a linear polarizer placed downstream of said light source to polarize said source light signal in said first polarization direction;
said optical coupling means comprise a first four-port two-by-two coupler;
said optical coupling means comprise an optical circulator placed upstream of said first coupler, said optical circulator having three ports connected to said light source, to one of the ports of said first coupler and to said detector, respectively;

said optical looping means comprise a second four-port two-by-two coupler, said power balance means also comprising said second coupler;

said optical looping means comprise a polarization separator;

said power balance means comprise an optical attenuator for a light signal polarized in said second polarization direction, so as to correct said return light power $P_{RET}$.

In the general case where the light power emits a non-polarized source light signal, the interferometric measurement device is designed for such a light source, and, on the one hand, said compensation pathway comprises an optical isolator intended to block a light signal polarized in the second polarization direction propagating on said compensation pathway in the reverse direction with respect to said compensation light signal, and on the other hand, said optical looping means comprise a polarization separator.

In this case, other advantageous and non-limitative characteristics of the interferometric measurement device according to the invention are the following:

said optical coupling means comprise a first four-port two-by-two coupler;

said optical coupling means comprise an optical circulator placed upstream of said first coupler, said optical circulator having three ports connected to said light source, to one of the ports of said first coupler, and to said detector, respectively, and said power balance means comprise said first coupler;

said optical coupling means further comprise a second four-port two-by-two coupler, and said power balance means comprise said second coupler;

said power balance means comprise an optical attenuator for a light signal polarized in said second polarization direction so as to correct said return light power $P_{RET}$;

said power balance means comprise said phase modulator and said electric processing and control means controlling said phase modulator to correct said output light power $P_{OUT}$.

The present invention finds a particularly advantageous application in the making of a fibre-optic gyrometer including an interferometric measurement device intended to measure the speed of rotation about an axis of rotation perpendicular to the plane of the Sagnac ring of the measurement interferometer.

Hence, the present invention also relates to a gyrometer including an interferometric measurement device according to the invention, the physical parameter to be measured being a component of the speed of rotation of said gyrometer about its axis of rotation, said axis of rotation being merged with the axis of revolution of the Sagnac ring.

The present invention moreover relates to an inertial attitude or navigation unit including at least one such gyrometer.

The invention may also find an application in the making of an electric current or magnetic field sensor including an interferometric measurement device according to the invention, intended to measure a phase difference produced in the Sagnac ring by Faraday effect.

DETAILED DESCRIPTION OF AN EXEMPLARY EMBODIMENT

The following description in relation with the appended drawings, given by way of non-limitative examples, will allow a good understanding of what the invention is consisted in and how it may be implemented.

Figure 1:
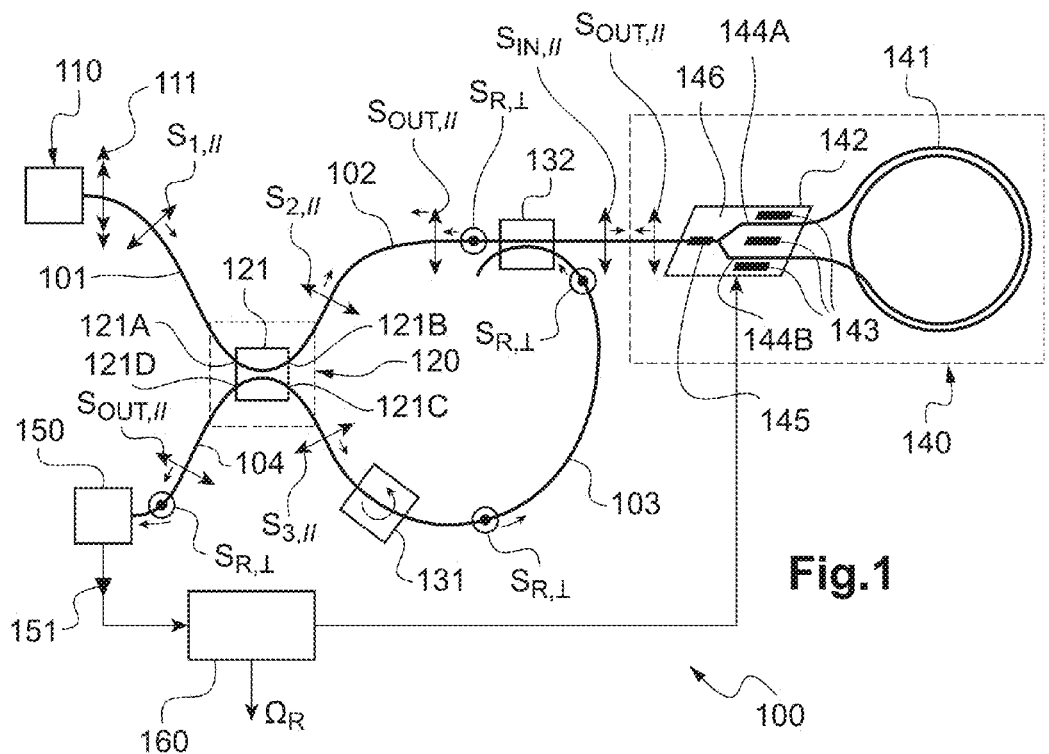
FIGS. 1 to 3 show schematic views of a first, a second and a third embodiments, respectively, of an interferometric measurement device according to the invention in which the device includes a linear polarizer placed downstream of the light source.

In FIGS. 1 to 8 are show schematic views showing an interferometric measurement device 100; 200; 300; 400 according to several embodiments of the invention and variants thereof.

This device 100; 200; 300; 400 is herein a fibre-optic device that includes several pathways 101, 102, 103, 104 of circulation for the propagation of light signals in this device 100; 200; 300; 400, all these pathways 101, 102, 103, 104 being formed of sections of optical fibres, for example silica optical fibres conventionally used in optical telecommunications.

In these various embodiments, the device 100; 200; 300; 400 includes a light source 110, a measurement interferometer 140 and a single optical radiation detector 150.

The light source 110 is herein a wide-spectrum spontaneous-emission light source. It is for example an ASE light source with an optical fibre doped with a rare earth, for example erbium, such as those conventionally used in the field of optical telecommunications.

This light source 110 may be filtered by means of a Bragg filter (not shown), so that it has an optical spectrum of substantially Gaussian shape, which is centred about a mean wavelength $\lambda_0$ of 1530 nm, i.e. 196 THz in frequency, and which has a full width at half maximum FWHM of 6.5 nm, i.e. 833 GHz, expressed in frequency.

This light source 110 is hence a wide-spectrum light source because the ratio between its full width at half maximum and its means wavelength $\lambda_0$ is equal to $4.2 \times 10^{-3}$, higher than $10^{-7}$.

This light source 110 emits a source light signal $S_{1,\parallel}$; $S_{1,\parallel}$, $S'_{1,\perp}$ on a source pathway 101 of the interferometric measurement device 100; 200; 300; 400. As mentioned hereinabove, the source pathway 101 is formed of a section of optical fibre, for example a section of polarization-maintaining single-mode fibre when the source is polarized (case of FIGS. 1 to 4) or a section of ordinary fibre when the source is non-polarized (case of FIGS. 5 to 8).

This source light signal $S_{1,\parallel}$; $S_{1,\parallel}$, $S'_{1,\perp}$ is contaminated with an excess relative intensity noise $B_{RIN}$, whose noise power spectral density is equal to 1/FWHM i.e. $1.2 \times 10^{-12}$/Hz, i.e. −119 dB/Hz.

The photonic noise power spectral density is constant and independent of the frequency, the photonic noise being known to be a white noise.

With an output power of 30 μW, the relative photonic noise $B_{ph}$ should be equal to $10^{-7}/\text{Hz}^{1/2}$, i.e. −140 dB/Hz for the relative photonic noise power spectral density.

Conversely, as mentioned above, it is known that the excess intensity noise is not rigorously a white noise.

Nevertheless, for the light source 110 that has a wide Gaussian optical spectrum of full width at half maximum FWHM=6.5 nm about the mean wavelength $\lambda_0$=1530 nm, the power spectral density of the excess relative intensity noise may be considered as being constant under a frequency equal to the tenth of the optical-frequency full width at half maximum FWHM(f), i.e. 83 GHz.

Hence, for a frequency band comprised between 0 and 100 MHz, for example, the power density of the excess relative intensity noise $B_{RIN}$ is very higher than the power density of the relative photonic noise, the difference being as high as 21 dB/Hz.

The measurement interferometer 140 of the interferometric measurement device 100; 200; 300; 400 in the different embodiments of the invention herein comprises a fibre-optic Sagnac ring 141 and a phase modulator 142.

The measurement interferometer 140 is intended to measure a physical parameter, to which the Sagnac ring 141 is sensitive.

Herein, this physical parameter to be measured is the component $\Omega_R$ of the speed of rotation of the measurement interferometer 140, along an axis of rotation (not shown) perpendicular to the plane of the Sagnac ring 141.

This interferometric measurement device 100; 200; 300; 400 may enter in the making of a gyrometer, herein a fibre-optic gyrometer, itself able to be a part of an inertial attitude or navigation unit.

The physical parameter $\Omega_R$ to be measured herein corresponds to component of the speed of rotation of the gyrometer about its axis of rotation, the latter being for example merged with the axis of the Sagnac ring.

As a variant, the interferometric measurement device may be a part of a current or magnetic field sensor. In this case, the physical parameter to be measured is an electric field or a magnetic field, which, by Faraday effect, induces a variation of the non-reciprocal phase difference between two contra-propagating light waves propagating in the Sagnac ring.

As known (see in particular H. Lefèvre, "*The Fiber-Optic Gyroscope*", Artech House, 1993), the Sagnac ring 141 includes a coil of optical fibre, preferably of the single-mode and polarization-maintaining type.

This coil of optical fibre has herein a length of 1 kilometer so that the Sagnac ring 141 has a proper frequency $f_p$=103.45 kHz.

Advantageously, and as shown only in FIG. 1, the measurement interferometer 140 includes a multi-function optical circuit 142 comprising an electro-optical substrate 146, an integrated Y-shaped optical junction 144, also called "Y-junction", an integrated polarizer 145 arranged on the base of the Y-junction 144, and two pairs of modulation electrodes 143 each placed on a branch 144A, 144B of the Y-junction 144, these modulation electrodes 143 forming said modulator 142 of the measurement interferometer 140.

Indeed, when modulation voltages are applied to the terminals of each of these two pairs of modulation electrodes 143, a modulated electric field appears in the electro-optical substrate 146 of the optical circuit 142 that will modulate the optical phase of the light signals passing through the optical circuit 142.

The measurement interferometer 140:
receives as an input an input light signal, herein represented by a double arrow and denoted by the reference sign $S_{IN,\|}$ (see FIGS. 1 à 8), and
produces as an output an output light signal, also represented by a double arrow and denoted by the reference sign $S_{OUT,\|}$ (see FIGS. 1 à 8).

The different light signals may circulate on the different pathways 101, 102, 103, 104 of the device 100; 200; 300; 400 in different propagation directions. Hence, for the sake of clarity, on the drawings, for each light signal, the propagation direction of the light signal considered on a pathway 101, 102, 103, 104 has been indicated by means of a small arrow substantially parallel to said pathway 101, 102, 103, 104.

Hence, in the drawings, the input light signal $S_{IN,\|}$ propagates on the measurement pathway 102, herein from the left to the right, and the output light signal propagates on the measurement pathway 102 from the right to the left.

Preferably, this measurement pathway 102 is formed of a section of polarization-maintaining optical fibre.

The input light signal $S_{IN,\|}$ has an input light power, denoted $P_{IN}$, and the output light signal $S_{OUT,\|}$ has an output light power, denoted $P_{OUT}$.

Conventionally, the output light power $P_{OUT}$ of the output light signal $S_{OUT,\|}$ depends on the physical parameter $\Omega_R$ to be measured and is proportional to the input light power $P_{IN}$ of the input light signal $S_{IN,\|}$.

The output light signal $S_{OUT,\|}$ is advantageously modulated to a modulation frequency $f_m$ thanks to the phase modulator 142 of the measurement interferometer 140.

This modulation is made desirable in order to improve the signal-to-noise ratio of the measurement performed by the measurement interferometer 140.

In practice, to the modulation of the output light signal $S_{OUT,\|}$ corresponds a modulation of the output light power $P_{OUT}$.

Advantageously, it is known that the modulation frequency $f_m$ may be an odd multiple of the proper frequency $f_p$ of the Sagnac ring 141 of the measurement interferometer 140.

In the following, it will be considered that the modulation frequency $f_m$ of the output light signal $S_{OUT,\|}$ is equal to the proper frequency $f_p$ of the measurement interferometer 140, i.e.: $f_m=f_p$=103.45 kHz for a coil of optical fibre of 1 km.

Moreover, by passing through the optical circuit 142, the output light signal $S_{OUT,\|}$ produced by the measurement interferometer 140 is linearly polarized in a first polarization direction (see for example H. Lefèvre, "*The Fiber-Optic Gyroscope*", Artech House, 1993—Appendix 3) thanks to the integrated polarizer 145 placed at the input/output of the optical circuit 142.

In this description and the associated figures, this first polarization direction (denoted by the sign ∥) is herein oriented in a plane parallel to the plane of the Sagnac ring 141.

In practice, whatever the polarization direction of the input light signal $S_{IN,\|}$, the output light signal $S_{OUT,\|}$ will be always polarized in this first polarization direction.

It will be seen in the following of the description that this property of the phase modulator 142 may be advantageously used for the making of the interferometric measurement device 100; 200; 300; 400 according to the invention.

The spontaneous-emission light source 110 of the device 100, 200, 300, 400 is, generally, a source that is not a priori polarized, so that the source light signal emitted by the light source 110 is not polarized.

It is known that the source light signal may then be decomposed into any two components having orthogonal polarization states: for example two rectilinear components crossed, i.e. perpendicular, relative to each other, or two circular components, one circular to the right and the other circular to the left.

To help the understanding, as shown in FIGS. 5 to 8 for the fourth, fifth, sixth and seventh embodiments in which the light source 110 is not polarized, the source light signal $S_{1,\parallel}$, $S'_{1,\perp}$ is decomposed into:

- a parallel component $S_{1,\parallel}$ whose rectilinear polarization is aligned in the first polarization direction (herein called the "parallel" direction), and
- a perpendicular component $S'_{1,\perp}$ whose rectilinear polarization is aligned in a second polarization direction (herein called the "perpendicular" direction), which is crossed, i.e. perpendicular, relative to the first polarization direction.

In the following of the description, for these particular embodiments, the source light signal may be liken to its two rectilinear polarization components $S_{1,\parallel}$, $S'_{1,\perp}$. Moreover, it will be seen that, for these particular embodiments, the parallel component $S_{1,\parallel}$ of the source light signal is the component that is used in the measurement interferometer 140, whereas the perpendicular component $S'_{1,\perp}$ of the source light signal is not exploited by the measurement interferometer 140.

Conversely, in the first, second and third embodiments shown in FIGS. 1 to 4, the source light signal is polarized.

This source light signal may be polarized either because the light source of the interferometric measurement device is intrinsically a polarized source, or by the use of an optical component that allows polarizing rectilinearly the source light signal emitted by a non-polarized light source.

In the first, second and third embodiments shown in FIGS. 1 to 4, it is the second case that is represented, and the interferometric measurement device 100; 200 includes a linear polarizer 111 that is placed downstream of the light source 110 to polarize the source light signal in the first polarization direction.

In practice, the axis of the linear polarizer 111 may be aligned with this first polarization direction during an operation of calibration of the light source 110.

Hence, at the output of the linear polarizer 111, the source light signal has only one rectilinear component, i.e. the parallel component $S_{1,\parallel}$, to which the source light signal may be liken.

To couple the light source 110 with the measurement interferometer 140, the device 100; 200; 300; 400 also includes optical coupling means 120; 220; 320; 420 (see FIGS. 1 to 8).

These optical coupling means 120; 220; 320; 420, whose different configurations will be described in detail in the following of the description, are connected to the light source 110 via the source pathway 101 so as to receive the source light signal $S_{1,\parallel}$; $S_{1,\parallel}$, $S'_{1,\perp}$ emitted by the light source 110.

The optical coupling means 120; 220; 320; 420 are also connected to the measurement interferometer 140 via the measurement pathway 102, so as to direct a part at least of the source light signal $S_{1,\parallel}$; $S_{1,\parallel}$, $S'_{1,\perp}$ received via the source pathway 101 towards the measurement pathway 102.

In the case where the source light signal $S_{1,\parallel}$, emitted by the light source 110 is polarized in the first polarization direction thanks to the linear polarizer 111 (cases of the 1$^{st}$, 2$^{nd}$ and 3$^{rd}$ embodiments, cf. FIGS. 1 to 4), the part of the source light signal $S_{1,\parallel}$ redirected towards the measurement pathway 102 by the optical coupling means 120; 220 comprises a single rectilinear component $S_{2,\parallel}$ of same polarization direction as the source light signal $S_{1,\parallel}$.

In the case where the source light signal $S_{1,\parallel}$, $S'_{1,\perp}$ emitted by the light source 110 is not polarized (cases of the 4$^{th}$, 5$^{th}$, 6$^{th}$ and 7$^{th}$ embodiments, cf. FIGS. 5 to 8), the part of the source light signal $S_{1,\parallel}$, $S'_{1,\perp}$ redirected towards the measurement pathway 102 by the optical coupling means 320; 420 comprises two rectilinear components $S_{2,\parallel}$, $S'_{2,\perp}$ whose polarization directions are respectively aligned with the polarization directions of the rectilinear components $S_{1,\parallel}$, $S'_{1,\perp}$ of the source light signal, i.e. in the first polarization direction and the second polarization direction.

As shown in FIGS. 1 to 7, the optical coupling means 120; 220; 320; 420 are moreover connected to a third pathway of said device 100; 200; 300; 400, called the compensation pathway 103, distinct from the measurement pathway 102 comprising the measurement interferometer 140, so as to tap off another part of the source light signal $S_{1,\parallel}$; $S_{1,\parallel}$; $S'_{1,\perp}$ towards this compensation pathway 103.

In all the embodiments shown in FIGS. 1 to 8, this compensation pathway 103 is preferably formed by a section of polarization-maintaining optical fibre.

In the case where the source light signal $S_{1,\parallel}$, emitted by the light source 110 is polarized in the first polarization direction thanks to the linear polarizer 111 (cases of the 1$^{st}$, 2$^{nd}$ and 3$^{rd}$ embodiments, cf. FIGS. 1 to 4), the part of the source light signal $S_{1,\parallel}$ tapped off toward the compression pathway 103 by the optical coupling means 120; 220 comprises a single rectilinear components $S_{3,\parallel}$ of same polarization direction as the source light signal $S_{1,\parallel}$.

In the case where the source light signal $S_{1,\parallel}$, $S'_{1,\perp}$ emitted by the light source 110 is not polarized (cases of the 4$^{th}$, 5$^{th}$, 6$^{th}$ and 7$^{th}$ embodiments, cf. FIGS. 5 to 8), the part of the source light signal $S_{1,\parallel}$, $S'_{1,\perp}$ tapped off towards the compensation means 103 by the optical coupling means 320; 420 comprises two rectilinear components $S_{3,\parallel}$, $S'_{3,\perp}$ whose polarization directions are respectively aligned with the polarization directions of the rectilinear components $S_{1,\parallel}$, $S'_{1,\perp}$ of the source light signal, i.e. in the first polarization direction and the second polarization direction.

Based on this other part $S_{3,\parallel}$; $S_{3,\parallel}$, $S'_{3,\perp}$ of the source light signal $S_{1,\parallel}$; $S_{1,\parallel}$, $S'_{1,\perp}$ tapped off and transmitted to the compensation pathway 103, the latter produces a compensation light signal $S_{R,\perp}$ having a return light power $P_{RET}$.

This compensation light signal $S_{R,\perp}$ is then re-coupled on the measurement pathway 102 thanks to optical looping means of the compensation pathway 103, the structure of which will be detailed hereinafter for the different embodiments of the invention and the variants thereof.

That way, the compensation light signal $S_{R,\perp}$ and the output light signal $S_{OUT,\parallel}$ circulate together in a same direction of propagation on the measurement pathway 102, towards the optical coupling means 120; 220; 320; 420 of the device 100; 200; 300; 400.

These optical coupling means 120; 220; 320; 420, connected to a fourth pathway of said device 100; 200; 300; 400, herein called the detection pathway 104 then allows directing together the output light signal $S_{OUT,\parallel}$ and the compensation light signal $S_{R,\parallel}$ towards detection means 150 placed at the end of the detection pathway 104 (see FIGS. 1 to 8).

In all the embodiments shown in FIGS. 1 to 8, this detection pathway 104 is formed by a section of polarization-maintaining optical fibre or an ordinary single-mode fibre. In both cases, the powers $P_{OUT}$ and $P_{RET}$ keep orthogonal polarizations.

Conventionally, these detection means 150 deliver an electric signal 151 (cf. FIG. 1) that is representative of the result of the measurement of the physical parameter $\Omega_R$ to which the measurement interferometer 140 is sensitive.

This electric signal is then transmitted to electric processing and control means 160 that process it, on the one hand, to provide the measurement of the physical parameter $\Omega_R$, and, on the other hand, to control the phase modulator 142 as a function of this measurement (see the arrow between the electric processing and control means 160 and the modulator 142 in FIG. 1).

More precisely, the electric processing and control means 160 use, by demodulation, the modulated electric signal 151 delivered by the detection means 150 in order to determine the component $\Omega_R$ of the speed of rotation of the measurement interferometer 140.

With no particular precaution, the electric signal 151 delivered by the detection means 150 is contaminated with noise, due not only to the photonic noise, but above all to the excess intensity noise that are present in the output light signal $S_{OUT,\parallel}$ exiting from the measurement interferometer 140, so that the measurement of the physical parameter $\Omega_R$ to be measured is not very accurate.

Hence, this is one of the objective of the invention to propose an interferometric measurement device wherein the effect of the relative intensity noise RIN of the light source 110 on the measurement of the physical parameter $\Omega_R$ to be measured is reduced, or even cancelled.

This is another objective of the invention to propose such an interferometric measurement device that is easy to implement.

For that purpose, according to the invention, it is provided that:
the compensation pathway 103 comprises polarization rotation means 131; 231; 331; 431 to produce the compensation light signal $S_{R,\perp}$ according to the second polarization direction crossed with the first polarization direction, and means 132; 134; 234; 334; 434 for the optical looping of the compensation pathway 103 to said measurement pathway 102, these optical looping means 132; 134; 234; 334; 434 receiving the compensation light signal $S_{R,\perp}$ circulating on the compensation pathway 103 and redirecting a part at least of the compensation light signal $S_{R,\perp}$ to the measurement pathway 102,
the detection means 150 comprise a single optical radiation detector, for example herein a semi-conductor PIN photodiode, connected to the optical coupling means 120; 220; 320; 420 receiving the output light signal $S_{OUT,\parallel}$ and the compensation light signal $S_{R,\perp}$, that circulate on the measurement pathway 102, for routing them towards said detector (150),
the device 100; 200; 300; 400 further includes power balance means 132; 121, 133; 222; 223; 233; 321, 333; 321, 322; 422 correcting the output light power $P_{OUT}$ and/or said return light power $P_{RET}$ routed towards the detector 150 so that the return light power $P_{RET}$ is substantially equal to the output light power $P_{OUT}$ at the level of this detector 150, and
said compensation pathway 103 has a length adjusted so that the output light signal $S_{OUT,\parallel}$ has at the level of the detector 150 a time delay $\tau$ with respect to the compensation light signal $S_{R,\perp}$ substantially equal to $1/(2*f_p)$.

In order to better understand the advantages and the operation of such an interferometric measurement device, the first embodiment of the interferometric measurement device 100 according to the invention shown in FIG. 1 will now be described in details.

First Embodiment

In this first embodiment, the optical coupling means 120 (cf. dotted lines in FIG. 1) comprise a first two-by-two (also denoted "2×2") coupler 121 with four ports 121A, 121B, 121C, 121D. This first coupler is conventionally characterized by its transmission coefficient, herein denoted $T_1$, which is comprised between 0 and 1 ($T_1=0$ corresponding to a transmission of 0% and 1 to a transmission of 100%), and its coupling coefficient, herein denoted $C_1$, which is comprised between 0 and 1 ($C_1=0$ corresponding to a coupling of 0% and 1 to a coupling of 100%).

Generally, this type of coupler has very low losses, so that the transmission coefficient $T_1$ and the coupling coefficient $C_1$ are simply linked by the relation $C_1=1-T_1$. For example, a 2×2 coupler of the 50/50 type is a coupler such that $T_1=0.5$ (50% of transmission) and $C_1=1-0.5=0.5$ (50% of coupling).

As shown in FIG. 1, the first coupler 121 is such that:
the first port 121A, connected to the source pathway 101, receives the source light signal $S_{1,\parallel}$ polarized in the first polarization direction (parallel direction)
the second port 121B, connected to the measurement pathway 102, transmits the part $S_{2\parallel}$ of the source light signal $S_{1,\parallel}$ on the measurement pathway 102, with a transmission factor equal to $T_1$.
the third port 121C, connected to the compensation pathway 103, couples the other part $S_{3,\parallel}$ of the source light signal $S_{1,\parallel}$ on the compensation pathway 103 with a coupling factor equal to $C_1$, and
the fourth port 121D, connected to the detection pathway 104, couples the output light signal and the compensation signal $S_{R,\perp}$ on the detection pathway 103, with the same coupling factor equal to $C_1$.

The other part $S_{3,\parallel}$ of the source light signal $S_{1,\parallel}$ coupled on the compensation pathway 103 is, like the source light signal, polarized in the first polarization direction. Thanks to the polarization rotation means 131 arranged on the compensation pathway 103, the polarization direction is rotated by 90° so as to generate said compensation light signal $S_{R,\perp}$ that is rectilinearly polarized in the second, crossed polarization direction, at 90° relative to the first polarization direction.

Advantageously, the polarization rotation means comprise the portion of optical fibre of the compensation pathway 103 that is comprised between the third part 121C of the first coupler 121, a portion of polarization-maintaining (PM) optical fibre being able to be twisted by 90° between its ends so as to obtain this rotation of polarization.

The compensation light signal $S_{R,\perp}$ then propagates along the compensation pathway 103 by keeping its polarization up to reach the means 132 for the optical looping of the compensation pathway 103 on the measurement pathway 102.

These coupling means comprise in this first embodiment a second four-port two-by-two coupler 132, having a transmission coefficient $T_2$ and a coupling coefficient $C_2$, defined in the same way as the first coupler 131.

Thanks to this second coupler 132, the compensation light signal $S_{R,\perp}$ circulating on the compensation pathway 103 is partially redirected on the measurement pathway 102, the coupled proportion depending on the coupling coefficient $C_2$ of the second coupler 132.

Likewise, the output light signal $S_{OUT,\parallel}$ coming from the measurement interferometer 140 and circulating on the measurement pathway 102 is transmitted by the second coupler 132 as a function of its transmission coefficient $T_2$.

The optical "re-looping" of the compensation path 103 on the measurement pathway 102 is herein essential to the implementation of the invention.

Thanks to it, it is possible to use detection means that include a single detector 150.

Indeed, after passing through the second coupler 132, the output light signal $S_{OUT,\parallel}$ and the compensation light signal $S_{R,\perp}$ propagate up to the second port 121B of the first coupler 121 that then route these signals, by coupling on the detection pathway 104 with a coupling coefficient equal to $C_1$ up to the detector 150.

Moreover, in the device 100 according to the invention, the length of the compensation pathway 103 is adjusted so that the output light signal $S_{OUT,\parallel}$ has, at the level of the detector 150, a time delay $\tau$ with respect to the compensation light signal $S_{R,\perp}$, which is, according to the invention, substantially equal to $1/(2*f_p)$, $f_p$ being hence the proper frequency of the Sagnac ring 141.

This time delay $\tau$ corresponds to the difference between the propagation times, between the light source 110 and the detector 150, between the light signal passed through the measurement interferometer 140 and the light signal passed by the compensation pathway 103.

The output light power $P_{OUT}$ and the return light power $P_{RET}$ arriving on the detector will now be expressed, at any instant t, as a function of the source light power $P_s$.

It will be first noted that this source light power $P_s$ fluctuates in time due to the excess intensity noise of the light source 110, so that the source light power $P_s$ may be written as: $P_s(t) = <P_S>*[1+B(t)]$, where the term $<P_S>$ represents the mean source light power and the term $B(t)$ represents the excess relative intensity noise of the light source 110, having a spectral density of power or "noise power" $B_{RIN}$ (see introduction).

For the compensation light signal $S_{R,\perp}$, which comes from the source light signal $S_{1,\parallel}$ coupled in the compensation pathway 103 by the first coupler 131, then rotated by 90°, then re-looped on the measurement pathway 102 by the second coupler 132, and finally redirected towards the detector 150 via the first coupler 131, the return light power $P_{RET}$ may be expressed as:

$$P_{RET}(t) = \alpha_r * P_S(t) * C_1 * C_2 * C_1 = \alpha_r * <P_S> * [1+B(t)] * C_1^2 * C_2,$$

the coefficient $\alpha_r$ representing a generic term accounting for the different optical losses intervening on the optical path of the compensation light signal $S_{R,\perp}$.

Likewise, for the output light signal $S_{OUT,\parallel}$, which comes from the source light signal $S_{1,\parallel}$ coupled in the measurement pathway 102 by the first coupler 131, then passes through the measurement interferometer 140 to exit on the measurement pathway 102 and is then redirected towards the detector 150 via the first coupler 131, the output light power $P_{OUT}$ may be expressed as:

$$P_{OUT}(t) = \alpha_m * P_S(t-\tau) * T_1 * T_2^2 * C_1 = \alpha_m * <P_S> * [1+B(t-\tau)] * T_1 * T_2^2 * C_1,$$

the coefficient $\alpha_m$ representing a generic term accounting not only for the different optical losses intervening on the optical path of the output light signal $S_{OUT,\parallel}$, but also, and above all, for the response of the measurement interferometer 140, this response being able to vary as a function of the depth of bias square modulation.

Hence, as the output light signal $S_{OUT,\parallel}$ and the compensation light signal are respectively polarized in the first and second polarization directions, that are crossed polarizations, these two signals add to each other in power, with no effect of interference at the level of the detector 150, so that the detected light power $P_D(t)$ received by the detector 150 at the instant t is equal to the sum $P_{RET}(t)+P_{OUT}(t)$ of the return light power $P_{RET}(t)$ and of the output light power $P_{OUT}(t)$, i.e. also: $P_D(t) = P_{RET}(t) + P_{OUT}(t)$.

The detected light power $P_D(t)$ may be written as:

$P_D(t) = <P_D>*[1+B_D(t)]$, where the term $<P_D>$ corresponds to the detected mean light power, exempt from noise, and where the term $B_D(t)$ corresponds to the noisy part of the detected light power $P_D(t)$, accounting in particular for the noise RIN.

Hence, to reduce the effect of the excess relative intensity noise (RIN) of the light source 110, it is hence understood that the noisy part $B_D(t)$ must be the lowest possible.

Taking back the mathematical expressions given hereinabove for the output light power $P_{OUT}(t)$ and the return light power $P_{RET}(t)$, the noisy part $B_D(t)$ may be expressed as:

$$B_D(t) = \alpha_r * <P_S> * B(t) * C_1^2 * C_2 + \alpha_m * <P_S> * B(t-\tau) * T_1 * T_2^2 * C_1, \text{ i.e.}$$

$$B_D(t) = <P_S> * C_1 * [\alpha_r * (1-T_2) * B(t) + \alpha_m * T_1 * T_2^2 * B(t-\tau)], \text{ with } C_1 = 1-T_1 \text{ and } C_2 = 1-T_2.$$

At this step, for the understanding, it will be considered, for example, that the optical losses for the compensation light signal are negligible, i.e. the coefficient $\alpha_r$ may be approximated to 1.

In this case, if we consider, for example, that the coefficient $\alpha_m$ is typically equal to 0.01, corresponding to −20 dB of losses in the measurement interferometer 140 due to the losses of coupling of the modulator 141, of the Sagnac ring 141 and of the modulation depth of the modulator 141, then it can be calculated that, if $T_1=0.5$ (i.e. $C_1=1-T_1=0.5$ i.e. 50%) and $T_2=0.99$ (i.e. $C_2=1-T_2=0.01$, i.e. 1%) then the output light power $P_{OUT}$ and the return light power $P_{RET}$ are substantially equal on the detector 150, so that the detected noisy part $B_D(t)$ is equal to: $B_D(t)=(1/400)*<P_S>*[B(t)+B(t-\tau)]$.

Generally, it is understood that it is possible to balance the return light power $P_{RET}$ with the output light power $P_{OUT}$ at the level of the detector 150 by suitably adjusting the transmission coefficients $T_1$, $T_2$, respectively the coupling coefficients $C_1$, $C_2$, of the first coupler 131 and the second coupler 132 of the device 100.

In other words, the first coupler 131 and the second coupler 132 herein form the power balance means correcting the output light power $P_{OUT}$ and the return light power $P_{RET}$ routed towards the detector 150.

According to the invention, the length of the compensation pathway 103 is adjusted so that the time delay $\tau$ between the output light signal $S_{OUT,\parallel}$ and the compensation light signal $S_{R,\perp}$ is substantially equal to $1/(2*f_p)$, the frequency spectrum of the power of noise received by the detector 150 has a low, or even zero, value, if the light powers $P_{RET}$, $P_{OUT}$ are perfectly balanced, for all the frequencies that are odd multiples of $1/(2*\tau)$, i.e. the odd multiples of the proper frequency $f_p$ of the measurement interferometer 140 (i.e. $f_p$, $3*f_p$, $5*f_p$, etc. . . . ).

In other words, by substantially balancing the output light power $P_{OUT}$ and the return light power $P_{RET}$ and by adjusting the time delay $\tau$ between the output light signal and the cross-polarization compensation light signal, it is possible to reduce, or even cancel, the effect of the excess intensity noise of the light source 110 on the measurement of the parameter $\Omega_R$ to be measured, the demodulation of the electric signal 151 delivered by the detector 150 thanks to the electric processing and control means 160 being actually made at the modulation frequency $f_m$ of the phase modulator, which is an odd multiple of the proper frequency $f_p$ of the measurement interferometer 140.

The different other embodiments of a device 100; 200; 300; 400 of the invention, shown in FIGS. 2 to 8, operating according to the same principle, will now be described.

Second Embodiment

Figure 2:
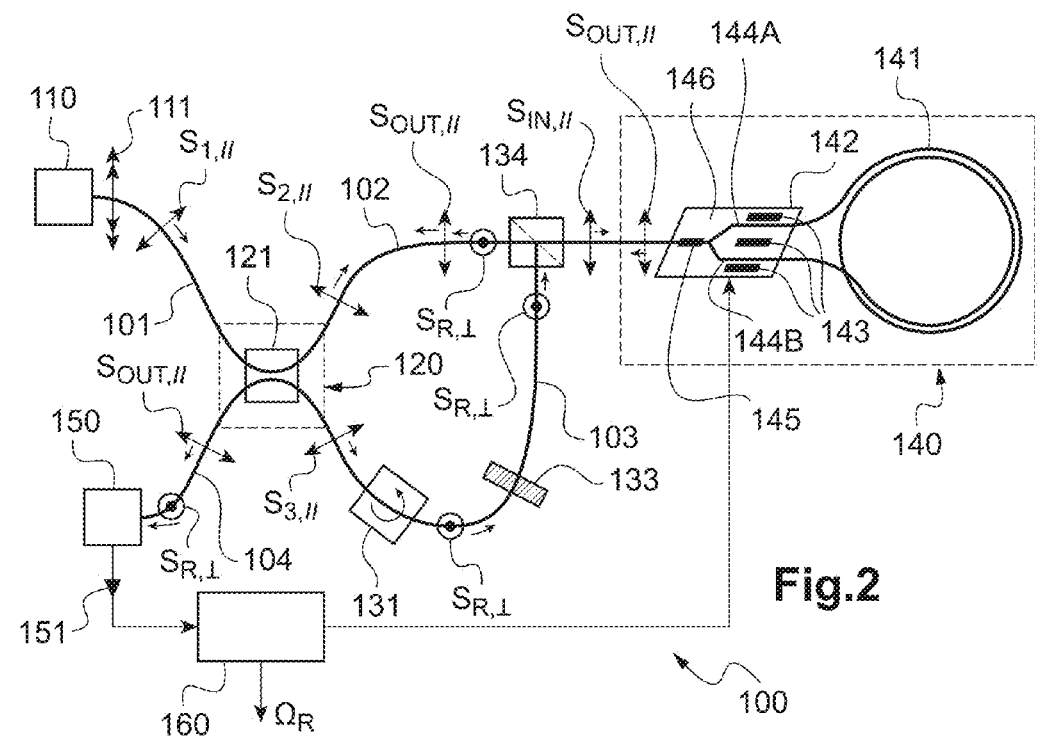

In FIG. 2 is shown, for example, a device 100 that is different from the first embodiment in that the optical looping means herein include a polarization separator 134 placed at the junction between the compensation pathway 103 and the measurement pathway 102.

This polarization separator 134 herein operates rather as a polarization combiner towards the measurement pathway 102: it transmits, on the one hand, the output light signal $S_{OUT,\parallel}$, polarized in the first polarization direction and coming from the measurement interferometer 140, and it redirects, on the other hand, the compensation light signal $S_{R,\perp}$, polarized in the second polarization direction and coming from the compensation pathway 103.

This polarization separator 134 may, for example, be formed by a polarization separator cube that is well known from the one skilled in the art.

This type of polarization separator 134 having generally substantially identical transmission and coupling coefficients, it may advantageously be provided to use an optical attenuator 133 allowing the reduction of the return light power $P_{RET}$ of the compensation light signal $S_{R,\perp}$.

Preferably, this optical attenuator 133 is placed on the compensation pathway 103 between the polarization rotation means 131 and the polarization separator 134.

Third Embodiment

Figure 3:
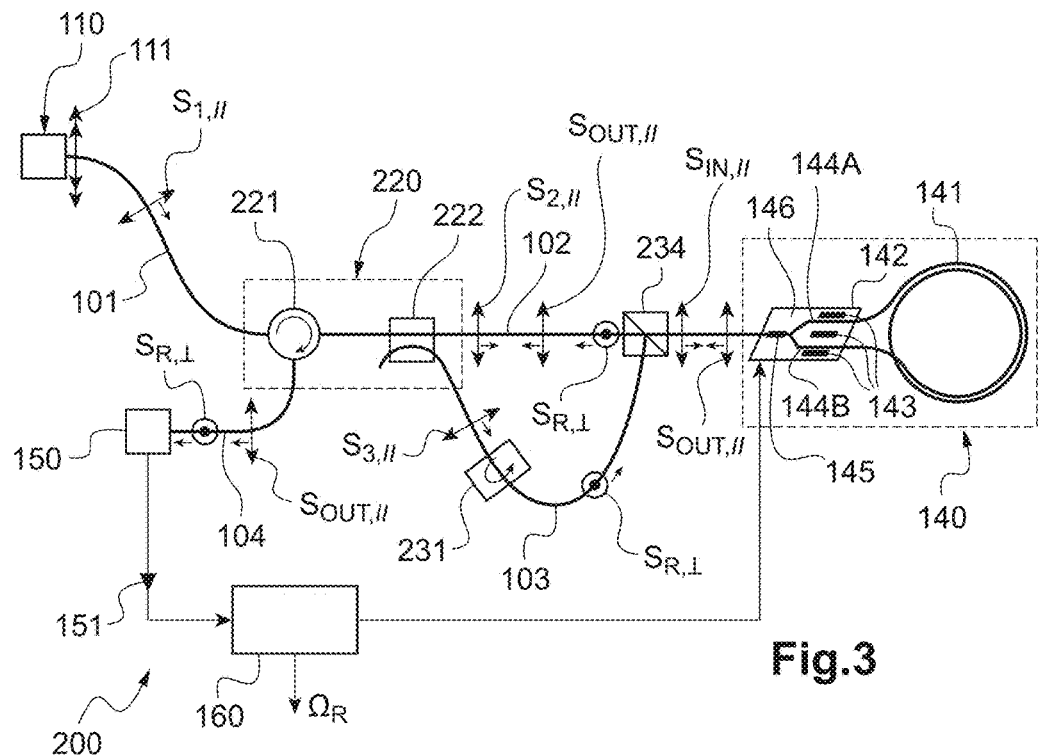

In a third embodiment shown in FIG. 3, the optical coupling means 220 herein comprise, in addition to the first coupler 222, an optical circulator 221 placed upstream of this first coupler 222 that has three ports connected to the light source 110, to one of the ports of said first coupler 222 and to the detector 150, respectively. In this configuration, the power balance means then comprise the first coupler 222 thanks to which, by adjusting the transmission coefficient $T_1$ and the coupling coefficient $C_1$, it is possible to substantially balance the output light power $P_{OUT}$ and the return light power $P_{RET}$ at the level of the detector 150.

For example, by taking back the numerical values of the example of the first embodiment for $\alpha_r$ and $\alpha_m$, then the transmission coefficient $T_1$ is equal to 0.99 for the first coupler 222.

Variant of the Third Embodiment

Figure 4:
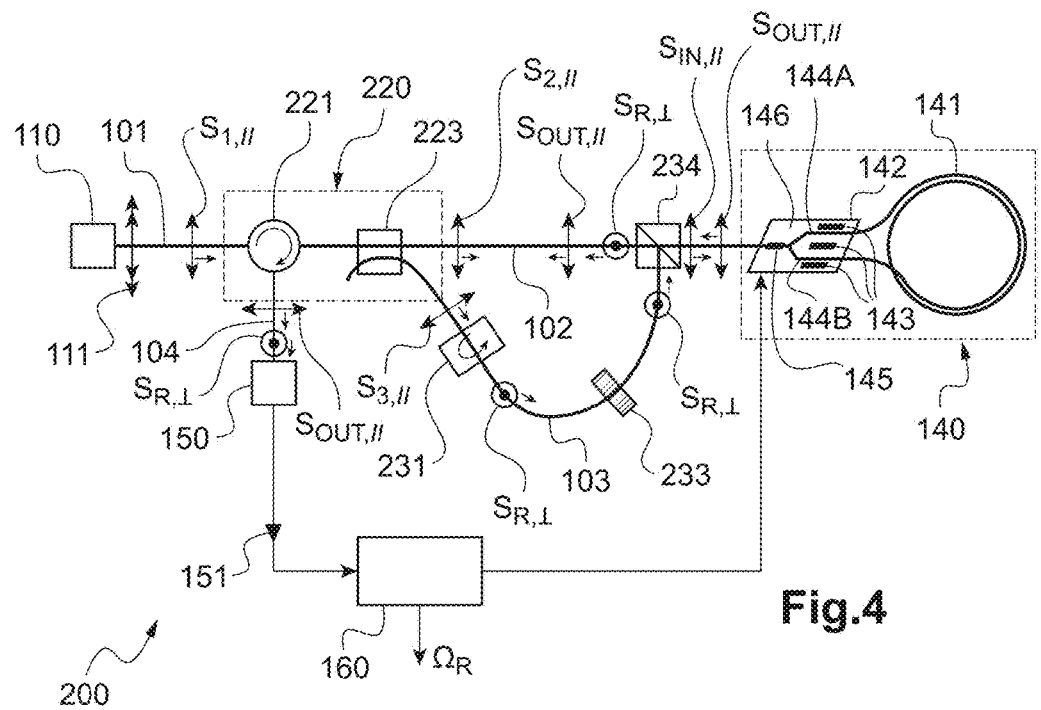
FIG. 4 show a schematic view of a variant of the third embodiment of FIG. 3, wherein the compensation pathway comprises an optical attenuator.

In a variant of the third embodiment shown in FIG. 4, it may be provided to use a first coupler 223 having transmission $T_1$ and coupling $C_1$ coefficients close to 0.5. In this case, it is then preferable to add an optical attenuator 223 to the compensation pathway 103 or to the measurement pathway 102 in order to correct the return light power $P_{RET}$ of the compensation light signal.

Fourth, Fifth, Sixth and Seventh Embodiments

In the fourth, fifth, sixth and seventh embodiments shown in FIGS. 5 to 8, respectively, it has been seen that the light source 110 of the interferometric measurement device 300; 400 was not polarized and emitted a source light signal able to be decomposed into only two orthogonal components $S_{1,\parallel}$, $S'_{1,\perp}$.

So that only the output light signal $S_{OUT,\parallel}$ polarized in the first polarization direction and the compensation light signal $S_{R,\perp}$ polarized in the second, crossed polarization direction, reach the detector 150 of the device 300; 400, the compensation pathway 103 comprises an optical isolator 332; 432 for the second polarization direction and the optical looping means comprise a polarization separator 334; 434.

In order to well understand the advantages of such a configuration when the light source 110 is not polarized, the route of the different light signals in the interferometric measurement device 300 for the fourth embodiment will be described in detailed.

Fourth Embodiment

Figure 5:
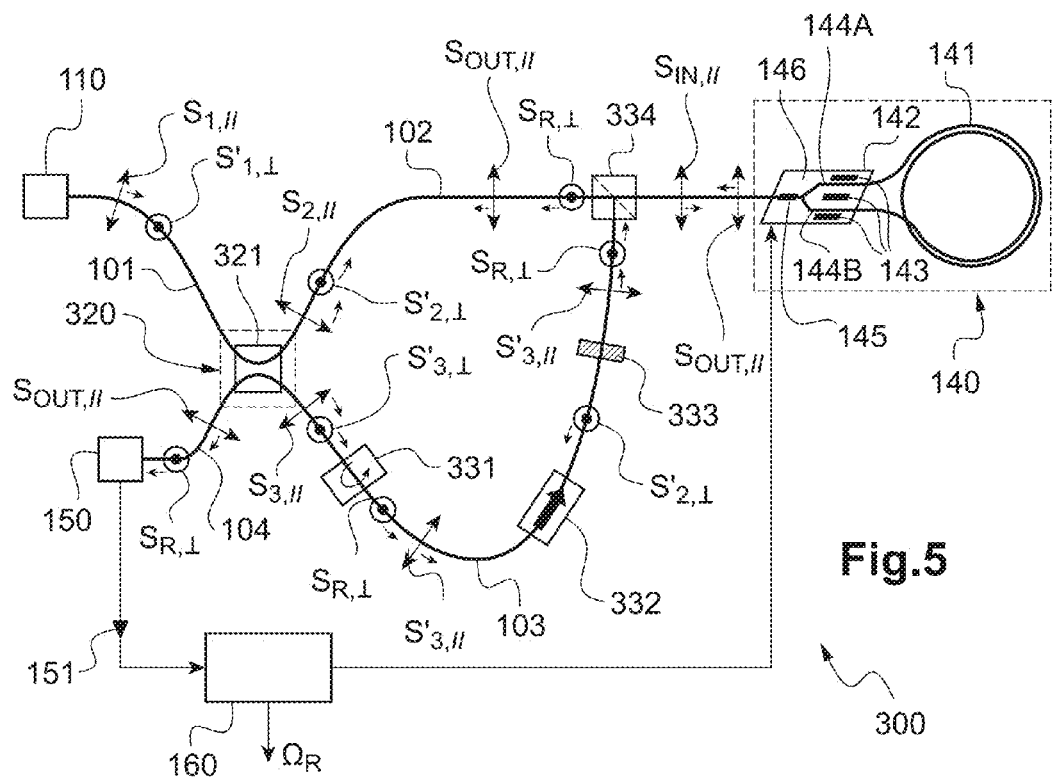
FIGS. 5 to 7 show schematic views of a fourth, a fifth and a sixth embodiment of an interferometric measurement device according to the invention designed for a non-polarized light source.

Hence, as shown in FIG. 5, the first coupler 321 of the optical coupling means 320 of the device, on the one hand, directs or transmits the source light signal $S_{1,\parallel}$, $S'_{1,\perp}$ towards the measurement pathway 102 along the two rectilinear components $S_{2,\parallel}$, $S'_{2,\perp}$, and, on the other hand, taps off or couples this same light signal $S_{1,\parallel}$, $S'_{1,\perp}$ towards the compensation path 103 along the two rectilinear components $S_{3,\parallel}$, $S'_{3,\perp}$.

As regards the components $S_{2,\parallel}$ and $S_{3,\parallel}$, these latter circulate in the device 300 in the same way as if the light source 110 was polarized in the first polarization direction. In particular, these two components $S_{2,\parallel}$ and $S_{3,\parallel}$ are those which give rise to the output light signal $S_{OUT,\parallel}$ and to the compensation light signal $S_{R,\perp}$, respectively.

Hence, for these two components $S_{2,\parallel}$ and $S_{3,\parallel}$, all happen as for the first three embodiments. In particular, the optical isolator 332 being oriented in the direction of propagation of the compensation light signal $S_{R,\perp}$, it does not block the latter.

For the two other components $S'_{2,\perp}$ and $S'_{3,\perp}$, coming from the component $S'_{1,\perp}$ of the source light signal polarized in the second polarization direction, the behaviour is different.

On the one hand, the perpendicular component $S'_{2,\perp}$ propagating on the measurement pathway 102 is firstly coupled on the compensation pathway 103 thanks to the polarization separator 334 so that this perpendicular component $S'_{2,\perp}$ propagates on the compensation pathway 103 in a direction opposite to that of the compensation light signal $S_{R,\perp}$. This perpendicular component $S'_{2,\perp}$ is then blocked by the optical isolator 332, so that it cannot be redirected towards the detector thanks to the first coupler 321.

On the other hand, the perpendicular component $S'_{3,\perp}$ propagating on the compensation pathway 103 is firstly rotated thanks to the polarization rotation means 331 so as to produce a parallel component $S'_{3,\parallel}$ propagating on the compensation pathway 103 in the same direction as the compensation light signal $S_{R,\perp}$. Being not blocked by the optical isolator 332, this parallel component $S'_{3,\parallel}$ arrives to the polarization separator 334 that does not re-couple it to the measurement pathway 102 because its polarization direction is oriented in the first polarization direction. Hence, this parallel component $S'_{3,\parallel}$ cannot reach the detector 150.

In other words, it can be said that:
for the source light signal $S_{1,\parallel}$ of parallel polarization direction, the interferometric measurement device 300 operates as the devices described hereinabove (cf. FIGS. 1 to 4), and
for the source signal $S'_{1,\perp}$ of perpendicular polarization direction, the interferometric measurement device 300 operates as a filter for this polarization, so that no light signal coming from this perpendicular component $S'_{1,\perp}$ circulating in the device 300 reaches the detector 150.

Hence, the explications given for the balance of the return light power $P_{RET}$ with the output light power $P_{OUT}$ and for the time delay $\tau$ between the output light signal $S_{OUT,\parallel}$ and the compensation light signal $S_{R,\perp}$ remain true in the case of a device 300 designed for a non-polarized light source 110.

In particular, it will be noted that the device 300 of FIG. 5, which also includes an optical attenuator 333 is different from the device of FIG. 2 only in that it includes the optical isolator 332.

Hence, to within the difference of the losses introduced by the optical isolator 332 on the compensation light signal $S_{R,\perp}$, the values of the transmission coefficient $T_1$ and of the coupling coefficient $C_1$ of the first coupler 321 are identical.

As a variant, the polarization separator could be replaced by another four-port two-by-two coupler and a linear polarizer oriented so as to block the propagation of the parallel component $S'_{3,\parallel}$ towards this other coupler could be introduced in the compensation pathway.

Fifth Embodiment

Figure 6:
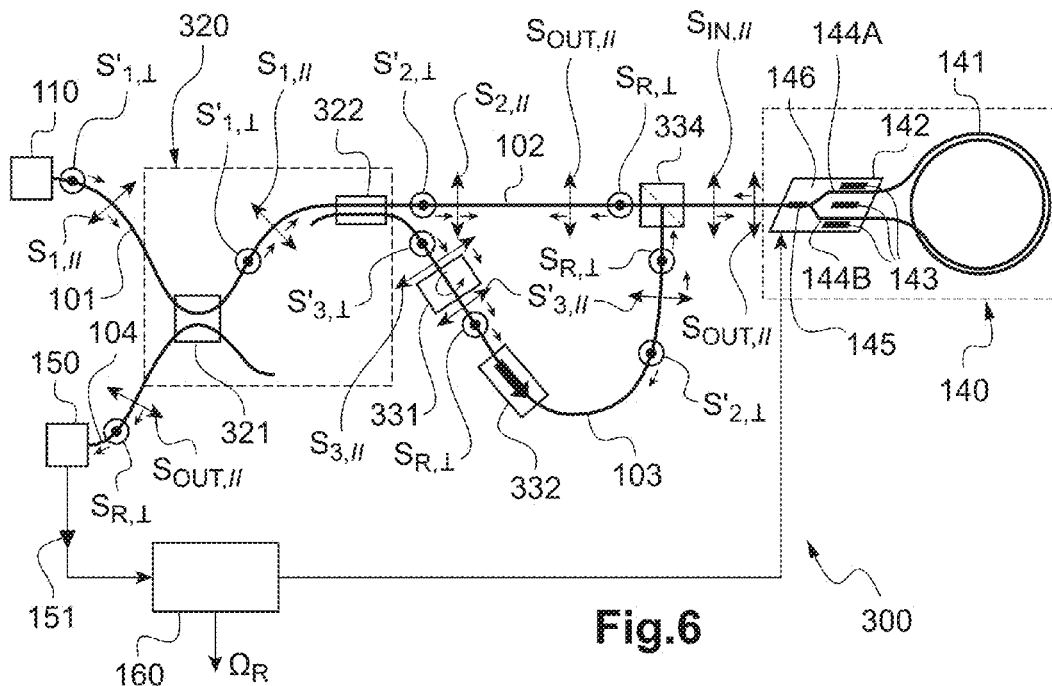

In a fifth embodiment shown in FIG. 6, the optical coupling means 320 of the device 300 further comprise a second four-port two-by-tow coupler 322, this second coupler 322 being a part of the power balance means.

Advantageously, the first coupler 321 may be an optical coupler of the low polarization-dependency type, having for each of the crossed polarizations a transmission coefficient of 50% and a coupling coefficient close to 50%. In this case, it is then possible to adjust the return $P_{RET}$ and output $P_{OUT}$ light powers thanks to the second coupler 322.

Sixth Embodiment

Figure 7:
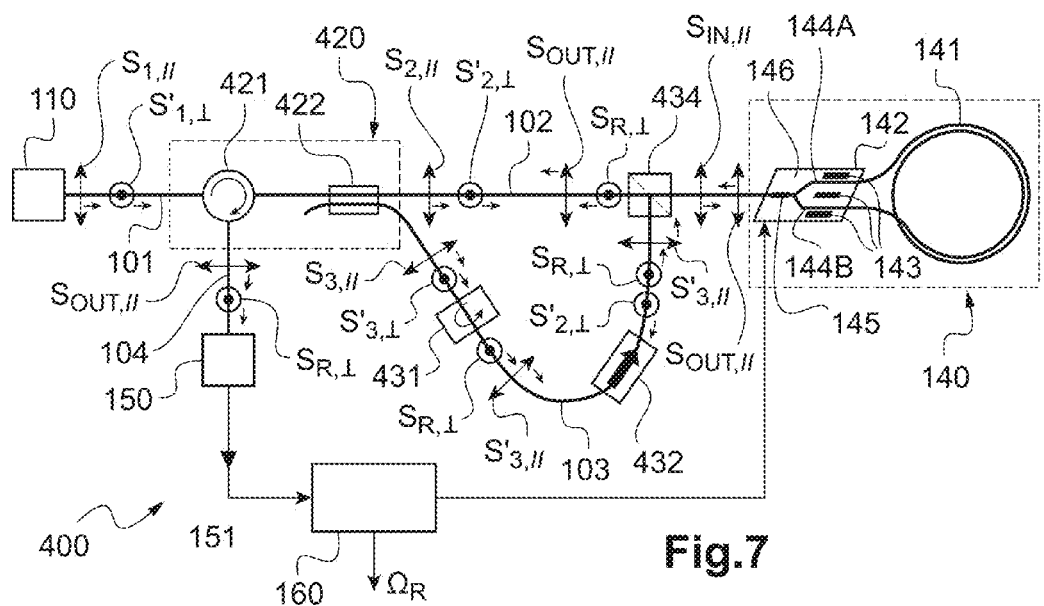

In a sixth embodiment shown in FIG. 7, instead of using two optical couplers 321, 322 as in the fifth embodiment (see FIG. 6), it may be provided to use a first coupler 422 in combination with an optical circulator 421 placed upstream of the first coupler 422, this optical circulator 421 having three ports connected to the light source 110, to one of the ports of the first coupler 422 and to the detector 150, respectively.

In this embodiment, it is then possible to balance the light powers thanks to the adjustment of the transmission and coupling coefficients of the first coupler 422.

Seventh Embodiment

Figure 8:
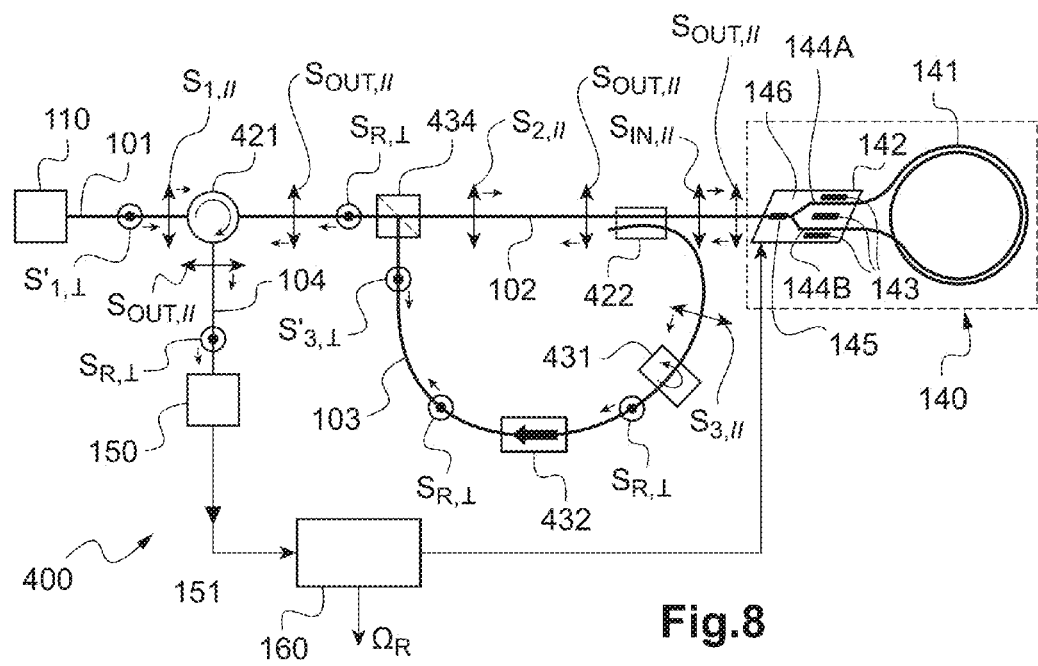
FIG. 8 shows a schematic view of a seventh embodiment of an interferometric measurement device according to the invention.

In a seventh embodiment shown in FIG. 8, similar to the sixth embodiment of FIG. 7, the device 400 is such that the positions of the polarization separator 434 and the first coupler 422 have been changed, the polarization separator 434 being now placed between the optical circulator 421 and the first coupler 422. Despite this inversion, the device 400 of this seventh embodiment operates as the previous one.

In all the embodiments of the interferometric measurement device 100; 200; 300; 400 shown in FIGS. 1 to 8, the device 100; 200; 300; 400 may advantageously be made operate in closed loop (see for example H. Lefèvre, <<The Fiber-Optic Gyroscope>>, Artech House, 1993—Chapter 8).

In this case, it will then be possible to correct the output light power $P_{OUT}$ of the output light signal $S_{OUT,\parallel}$ exiting from the measurement interferometer 140 by modifying the depth of modulation thanks to the phase modulator 142 and to the electric processing and control means 160 controlling this modulator 142.

For that purpose, a bias square modulation will be chosen, which does not degrade the photonic noise on the detector 150, for example with a bias phase-shift (usually denoted $\varphi_b$) between $\pm 3\pi/4$ and $\pm 7\pi/8$.

This allows a fine adjustment of the balance of the output $P_{OUT}$ and return $P_{RET}$ light powers by electronic method, thanks to the modulator 142 and to the electric processing and control means 160.

Generally, these "electronic" balance means may be combined with "optical" balance means, such as an attenuator or a coupler, which allow a first rough adjustment of the power balance.

Moreover, when the power balance means comprise the modulator and the electric processing and control means, it is possible to compensate for the drift in time of the return power $P_{OUT}$ of the measurement interferometer by modifying the phase-shift value $\varphi_b$ of the bias square modulation$\pm\varphi_b$.

The invention claimed is:

1. A device (100; 200; 300; 400) for interferometric measurement of a parameter ($\Omega_R$) to be measured, including:
 a wide-spectrum spontaneous-emission light source (110) emitting a source light signal ($S_{1,\parallel}$, $S'_{1,\perp}$) and having an excess relative intensity noise (RIN),
 detection means (150) delivering an electric signal representative of the result of a measurement of said parameter ($\Omega_R$) to be measured,
 electric processing and control means (160) processing said electric signal to provide said measurement of said parameter ($\Omega_R$) to be measured, and
 optical coupling means (120; 220; 320; 420):
  receiving said source light signal ($S_{1,\parallel}$, $S'_{1,\perp}$),
  directing a part ($S_{2,\parallel}$, $S'_{2,\perp}$) at least of said source light signal ($S_{1,\parallel}$, $S'_{1,\perp}$) towards a measurement pathway (102) comprising a measurement interferometer (140) that includes a phase modulator (142) and a Sagnac ring (141), of proper frequency $f_p$, sensitive to said parameter ($\Omega_R$) to be measured, said interferometer receiving, as an input, an input light signal ($S_{IN,\parallel}$) of input light power ($P_{in}$) and producing, as an output, an output light signal ($S_{OUT,\parallel}$) of output light power ($P_{OUT}$) depending on said physical parameter ($\Omega_R$) to be measured and proportional to said input light power ($P_{in}$), said output light signal ($S_{OUT,\parallel}$) being polarized in a first polarization direction and modulated at a modulation frequency $f_n$ thanks to said phase modulator (142),
  tapping off another part ($S_{3,\parallel}$, $S'_{3,\perp}$) of said source light signal ($S_{1,\parallel}$, $S'_{1,\perp}$) towards a noise (RIN) compensation pathway (103) distinct from the said measurement pathway (102), said compensation pathway (103) producing a noise (RIN) compensation light signal ($S_{R,\perp}$) having a return light power ($P_{RET}$),
  directing said output light signal ($S_{OUT,\parallel}$) and said compensation light signal ($S_{R,\perp}$) towards said detection means (150),
 characterized in that:
 said compensation pathway (103) comprises:
  polarization rotation means (131) adapted to produce said compensation light signal ($S_{R,\perp}$) in a second polarization direction crossed with said first polarization direction, and
  means (132; 134; 234; 334; 434) for optically looping said compensation pathway (103) on said measurement pathway (102), said optical looping means (132; 134; 234; 334; 434) receiving said compensation light signal ($S_{R,\perp}$) circulating on said compensation pathway (103) and redirecting a part at least of said compensation light signal ($S_{R,\perp}$) towards said measurement pathway (102), said detection means (150) comprise a single optical radiation detector (150) connected to said optical coupling means (120; 220; 320; 420), said optical coupling means (120; 220; 320; 420) receiving said output light signal ($S_{OUT,\parallel}$) and said compensation light signal ($S_{R,\perp}$), which circulate on said measurement pathway (102), for routing them towards said detector (150), said device (100; 200; 300; 400) further includes power balance means (132; 121, 133; 222; 223; 233; 321, 333; 321, 322; 422) correcting said output light power ($P_{OUT}$) and/or said return light power ($P_{RET}$) routed towards said detector (150) in such a manner that said return light power ($P_{RET}$) is substantially equal to said output light power ($P_{OUT}$) at the level of said detector (150), and said compensation pathway (103) has a length adjusted so that said output light signal ($S_{OUT,\parallel}$) has at the level of the detector (150) a time delay $\tau$ with respect to said compensation light signal ($S_{R,\perp}$) substantially equal to $1/(2*f_p)$.

2. The interferometric measurement device (100; 200) according to claim 1, further including a linear polarizer (111) placed downstream of said light source (110) to polarize said source light signal ($S_{1,\parallel}$) in said first polarization direction.

3. The interferometric measurement device (100; 200) according to claim 2, wherein said optical coupling means (120; 220) comprise a first four-port two-by-two coupler (121; 222; 233).

4. The interferometric measurement device (200) according to claim 3, wherein said optical coupling means (220) comprise an optical circulator (221) placed upstream of said first coupler (222, 223), said optical circulator (221) having three ports connected to said light source (110), to one of the ports of said first coupler (222; 223) and to said detector (150), respectively.

5. The interferometric measurement device (100) according to claim 4, wherein said optical looping means comprise a second four-port two-by-two coupler (132), said power balance means also comprising said second coupler (132).

6. The interferometric measurement device (100; 200) according to claim 5, wherein said power balance means comprise an optical attenuator (133; 233) for a light signal ($S_{3,\perp}$) polarized in said second polarization direction so as to correct said return light power ($P_{RET}$).

7. The interferometric measurement device (100; 200) according to claim 4, wherein said optical looping means comprise a polarization separator (134; 234).

8. The interferometric measurement device (100; 200) according to claim 7, wherein said power balance means comprise an optical attenuator (133; 233) for a light signal ($S_{3,\perp}$) polarized in said second polarization direction so as to correct said return light power ($P_{RET}$).

9. The interferometric measurement device (100) according to claim 3, wherein said optical looping means comprise a second four-port two-by-two coupler (132), said power balance means also comprising said second coupler (132).

10. The interferometric measurement device (100; 200) according to claim 9, wherein said power balance means comprise an optical attenuator (133; 233) for a light signal ($S_{3,\perp}$) polarized in said second polarization direction so as to correct said return light power ($P_{RET}$).

11. The interferometric measurement device (100; 200) according to claim 3, wherein said optical looping means comprise a polarization separator (134; 234).

12. The interferometric measurement device (100; 200) according to claim 11, wherein said power balance means comprise an optical attenuator (133; 233) for a light signal ($S_{3,\perp}$) polarized in said second polarization direction so as to correct said return light power ($P_{RET}$).

13. The interferometric measurement device (300; 400) according to claim 1, designed for a light source (110) emitting a non-polarized source light signal ($S_{1,\parallel}$, $S'_{1,\perp}$), wherein:

said compensation pathway (103) comprises an optical isolator (332, 432) intended to block a light signal ($S'_{2,\perp}$) polarized in the second polarization direction propagating on said compensation pathway (103) in a reverse direction with respect to said compensation light signal ($S_{R,\perp}$), and said optical looping means comprise a polarization separator (334; 434).

14. The interferometric measurement device (300; 400) according to claim 13, wherein said optical coupling means (320; 420) comprise a first four-port two-by-two coupler (321; 422).

15. The interferometric measurement device (300; 400) according to claim 14, wherein:

said optical coupling means (320) further comprise a second four-port two-by-two coupler (322), and said power balance means comprise said second coupler (322).

16. The interferometric measurement device (300; 400) according to claim 13, wherein:

said optical coupling means (420) comprise an optical circulator (421) placed upstream of said first coupler (321; 422), said optical circulator (421) having three ports connected to said light source (110), to one of the ports of said first coupler (321; 422) and to said detector (150), respectively, and said power balance means comprise said first coupler (321; 422).

17. The interferometric measurement device (300) according to claim 13, wherein said power balance means comprise an optical attenuator (333) for a light signal ($S_{3,\perp}$) polarized in said second polarization direction so as to correct said return light power ($P_{RET}$).

18. An inertial attitude and navigation unit including at least one gyrometer according to claim 13.

19. The interferometric measurement device (100) according to claim 1, wherein said power balance means comprise said phase modulator (143) and said electric processing and control means (160) controlling said phase modulator (143) to correct the output light power ($P_{OUT}$).

20. A gyrometer including an interferometric measurement device (100; 200; 300; 400) according to claim 1, said physical parameter ($\Omega_R$) to be measured being a component of the speed of rotation of said gyrometer about its axis of rotation.

* * * * *